F. C. Payne,

Bed Bottom

No. 1,941. Reissued Apr. 25, 1865.

Witnesses.

H. Coombs

G. W. Reed.

Inventor:

F. C. Payne per Brown Combs & Co.

Attorneys.

UNITED STATES PATENT OFFICE.

FREDERICK C. PAYNE, OF NEW YORK, N. Y.

IMPROVED FOLDING BED-BOTTOM.

Specification forming part of Letters Patent No. 42,108, dated March 29, 1864; Reissue No. 1,941, dated April 25, 1865.

*To all whom it may concern:*

Be it known that I, FREDERICK C. PAYNE, of the city, county, and State of New York, have invented a new and useful Improvement in Folding Bed-Bottoms; and I do hereby declare that the following is a full, clear, and exact description of the same, reference being had to the accompanying drawings, forming part of this specification.

This invention relates to folding bed-bottoms, or, as they are frequently termed, "folding box-mattresses," composed of a folding box or frame containing or having attached to it a series of springs overlaid with stuffing.

It consists in a certain method of connecting the two parts of which the box or frame is constructed, whereby they are permitted to fold one upon or parallel with the other without injury to the stuffing or the casing or covering thereof, or the straining of the connecting-joint.

Figure 2:
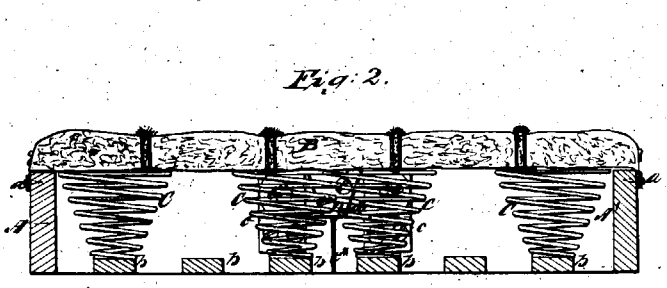
Figure 1:
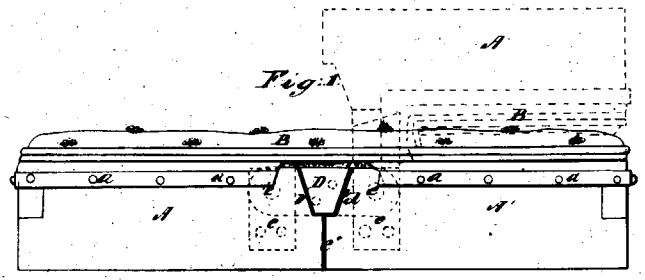
Figure 3:
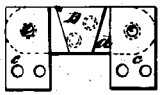
Figure 4:
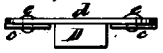

Figure 1 in the drawings is a side view of a folding bed-bottom or box-mattress constructed according to my invention. Fig. 2 is a central longitudinal vertical section of the same. Fig. 3 is a side view of one of the joints. Fig. 4 is a top view of the same.

Similar letters of reference indicate corresponding parts in the several figures.

A A′ is the box or frame, having slats *b b* across its bottom for the support of the springs C C, which support the mattress-stuffing B and its case or covering of ticking or other fabric, which is also secured by tacks *a a*, or other means, to the upper edge of the box or frame. The box or frame is divided transversely into two parts, A and A′, of equal or suitable size, by a double hinge-joint, composed of a plate, *d*, of metal, pivoted at or near its ends by pins *e e* to the upper parts of two plates, *c c*, which are rigidly secured by screws or other means, one to each of the parts A A′ of the box or frame. The length of the plates *d* between the centers of the pins *e e* is such as to permit one part of the box or frame and the attached portion of the mattress-stuffing to fold over, upon, or parallel with the other part, as illustrated in red outline in Fig. 1, the said plates being then perpendicular to the box or frame. This length, it is obvious, should be equal to twice the height or depth from the centers of the pins or pivots *e* to the top of the stuffing, or so nearly so that in folding what it lacks of such length may be compensated for by such a slight compression of the mattress-stuffing as is admissible without injury to the latter or the straining of the joint.

When the two parts A and A′ of the box or frame are straightened out into a horizontal position for use, their connected ends abut against each other below the said plates, as shown at *e** in Figs. 1 and 2; but above the line of the lower edges of the plates *d* the said ends are recessed in such manner (shown at *i i* in Fig. 1) that the two recesses in each slide combine to form one V-shaped recess for the reception of one of two V-shaped blocks, D, one of which is attached to each of the plates *d* by screws *f f*, or other means, and to which are attached the portions of the mattress-stuffing and its case or cover which come over the joints, the said blocks serving to give rigidity to the joint when extended, but moving out of the recesses *i i* when one end of the frame is raised, and so permitting the frame to fold with the stuffing between the two parts A A′.

What I claim as my invention, and desire to secure by Letters Patent, is—

1. The connection of the two parts A A′ of the frame or box of a folding bed bottom or mattress on each side thereof by means of a double hinge composed of a plate, *d*, pivoted to the said parts A A′ at two points at such a distance apart as to make room for the stuffing between the said parts when folded parallel with each other, substantially as herein described.

2. The blocks D D, in combination with the plates *d* and the recesses *i i* in the connected ends of the two portions A A′ of the box or frame, substantially as and for the purpose specified.

F. C. PAYNE.

Witnesses:
J. W. COOMBS,
G. W. REED.